US010944465B2

(12) United States Patent
Reider et al.

(10) Patent No.: US 10,944,465 B2
(45) Date of Patent: Mar. 9, 2021

(54) SYSTEM AND METHOD FOR ANTENNA BEAM SELECTION

(71) Applicant: Telefonaktiebolaget LM Ericsson (publ), Stockholm (SE)

(72) Inventors: Norbert Reider, Tényö (HU); András Rácz, Budapest (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/637,597

(22) PCT Filed: Aug. 9, 2017

(86) PCT No.: PCT/EP2017/070202
§ 371 (c)(1),
(2) Date: Feb. 7, 2020

(87) PCT Pub. No.: WO2019/029802
PCT Pub. Date: Feb. 14, 2019

(65) Prior Publication Data
US 2020/0186227 A1    Jun. 11, 2020

(51) Int. Cl.
*H04B 7/06* (2006.01)
*G06N 20/00* (2019.01)

(52) U.S. Cl.
CPC .......... *H04B 7/0695* (2013.01); *G06N 20/00* (2019.01); *H04B 7/0626* (2013.01)

(58) Field of Classification Search
CPC .... H04B 7/0695; H04B 7/0617; H04B 7/088; H04B 7/0413; H04B 7/0452; H04B 7/0632; H04B 7/0626; H04L 41/147
(Continued)

(56) References Cited

U.S. PATENT DOCUMENTS 8,942,659 B2    1/2015  Gulati et al.
9,973,849 B1 *  5/2018  Zhang ................. H04R 3/005
(Continued)

FOREIGN PATENT DOCUMENTS

EP         2930966 A1    10/2015
WO      2017032394 A1     3/2017

OTHER PUBLICATIONS

Corroy, Steven, "Learning RAN", Ericsson Confidential, Oct. 24, 2016, pp. 1-8.
(Continued)

*Primary Examiner* — Emmanuel Bayard
(74) *Attorney, Agent, or Firm* — Murphy, Bilak & Homiller, PLLC

(57) ABSTRACT

We generally describe a system (100) for antenna beam selection in a radio access network. The system (100) comprises a measurement module (102) which is configured to obtain channel quality measurements of a plurality of beams usable to serve a user equipment (112) in the 5G radio access network. The system (100) further comprises a training module (104) coupled to the measurement module (102), wherein the training module (104) is configured to generate a machine learning model based on the channel quality measurements. The system (100) further comprises a prediction module (106) coupled to the training module (104), wherein the prediction module (106) is configured to receive the machine learning model from the training module (104), and select, based on the machine learning model, one of the plurality of beams used to serve the user equipment (112).

14 Claims, 11 Drawing Sheets

(58) Field of Classification Search
USPC .................................. 375/267, 299, 347–349
See application file for complete search history.

(56) References Cited

U.S. PATENT DOCUMENTS

| | | | | |
|---|---|---|---|---|
| 10,171,150 | B1* | 1/2019 | Marupaduga | H04B 7/0617 |
| 10,498,029 | B1* | 12/2019 | Tran | F21S 8/086 |
| 2015/0254554 | A1* | 9/2015 | Kato | G06N 3/084 |
| | | | | 706/21 |
| 2016/0003932 | A1* | 1/2016 | Whitney | G08B 21/0275 |
| | | | | 342/451 |
| 2016/0142922 | A1* | 5/2016 | Chen | H04B 7/0851 |
| | | | | 375/267 |
| 2016/0277089 | A1* | 9/2016 | Jung | G06F 3/04883 |
| 2016/0337881 | A1 | 11/2016 | Zhang et al. | |
| 2017/0331670 | A1* | 11/2017 | Parkvall | H04W 52/0274 |
| 2018/0006696 | A1* | 1/2018 | Yue | H04B 7/063 |
| 2018/0352519 | A1* | 12/2018 | Navarro | H04W 52/367 |
| 2019/0364492 | A1* | 11/2019 | Azizi | H04W 48/10 |

OTHER PUBLICATIONS

Costantine, J, et al., "Applying Graph Models and Neural Networks on Reconfigurable Antennas for Cognitive Radio Applications", 2011, pp. 909-912.

Ekman, Björn, "Machine Learning for Beam Based Mobility Optimization in NR", Master of Science Thesis in Communication Systems; Department of Electrical Engineering; Linkoping University, 2017, pp. 1-86.

Gulati, Nikhil, et al, "Learning State Selection for Reconfigurable Antennas: A Multi-Armed Bandit Approach", IEEE Transactions on Antennas and Propagation, vol. 62, No. 3, Mar. 2014, pp. 1027-1038.

Imtiaz, Sahar, et al., "Learning-Based Resource Allocation Scheme for TDD-Based 5G Gran System", Nov. 13-17, 2016, pp. 176-185.

Svensson, Martin, "Machine-learning technologies in telecommunications", Mar. 2008, pp. 29-33.

* cited by examiner

400

SYSTEM AND METHOD FOR ANTENNA BEAM SELECTION

TECHNICAL FIELD

The present disclosure generally relates to systems and methods for antenna beam selection in 5G radio access networks (RANs) based on machine learning, in particular using distributed cloud-based machine learning.

BACKGROUND

Machine Learning

Machine learning (ML) techniques have recently gained a lot of attention. It enables software components to learn from experiences instead of being explicitly programmed for a specific task. One of the main focuses of machine learning research is to extract information from data automatically using computational and statistical methods. The business potential and some possible applications of machine learning in the telecommunication domain have been discussed in the art. Some high-level areas have been described where machine learning can create business value in the telecommunication domain including personalization (user segmentation, user profiling), recommendation (hints about user preferences) and media recognition (e.g., automated tagging and categorization of media content). Applications of machine learning for enhancing performance of 4G radio access network functions have also been in the focus of research.

Beam Selection in 5G

Advanced antennas are a crucial part of, for example, 5G radio access. These antennas will typically be used at high carrier frequencies in order to achieve high throughput. At high frequencies, the propagation becomes more hostile. However, as the carrier frequency gets higher, the antenna elements get smaller. This enables packing more antenna elements into a smaller antenna. For example, at 15 GHz, it is possible to design an antenna with 200 elements that is only 5 cm wide and 20 cm tall. With more antenna elements, it becomes possible to produce antenna systems where many directed antenna beams are created to cover a relatively narrow geographical area. Using these advanced antenna techniques, the network can select a serving beam that may have the best coverage for the intended receiver. Since these beams are quite narrow in terms of beam-width, and thus the transmission is concentrated into a certain direction, the signal strength can be significantly improved, while interference can be reduced due to the relatively lower number of served user equipment (UEs) per beam.

The beam selection problem in the 5G system is concerned with how to select a beam to serve the user equipment dynamically which has the highest channel quality in order to provide the best coverage and minimize interference.

Existing beam selection solutions typically rely on measuring a large number of reference signals from each of the antennas and determining the optimal beam which is selected to serve the user equipment based on these measurements. The main drawback of these solutions is that they require constantly measuring a large number of reference signals, which consumes a considerable amount of radio capacity and requires significant terminal time and battery resources. As a result, system capacity may be reduced.

Measuring only a subset of the signals and using prediction and interpolation techniques to estimate the rest of the reference signals are one way to overcome these drawbacks. Machine learning is one possible technique to perform such predictions. However, most of the existing machine learning solutions are applied in the fields of image processing, computer vision and voice recognition.

Some systems use machine learning algorithms to re-shape the antenna's radiation pattern such that a closed form objective function is maximized, as shown, e.g., in U.S. Pat. No. 8,942,659 B2. However, no practical aspects, such as limited processing and measurement capabilities as well as tight delay constraints, have been mentioned. These aspects may be important since, in practice, the beam selection may be executed on a millisecond (msec) level depending on the speed of the user equipment. The optimal beam selection may require a lot of channel state information (CSI) and some computationally heavy algorithm (e.g., an exhaustive search) which may limit practical applications of such solutions. Neural networks have been used to change between different antenna configurations for reconfigurable antennas. This solution is tailored to a specific type of antenna which the neural network is trained for. Furthermore, it uses special hardware (Field-Programmable Gate Arrays, FPGAs) to run the implementation.

SUMMARY

It has been realized that no solution has been thought of thus far where a practically applicable algorithm is taken into consideration in the beam selection problem which can be directly applied in the fast control loop and requires only a fraction of CSI measurements from the terminal.

Moreover, it has been realized that there are no solutions available for how to execute machine learning tasks in a scalable and feasible manner utilizing the available compute and communication resources not only but also in, for example, a 5G network environment, such that the stringent delay and reliability requirements of the beam selection procedure is fulfilled without the need to place additional hardware resources onto the (5G) radio boards. It has been realized that there is a conflicting requirement, which on one hand would mandate deploying all of the compute onto the radio board to fulfil delay requirements, while at the same time there is a tendency to move compute and functionality (including some of the baseband functions) further away, for example into the cloud.

According to a first aspect of the present disclosure, there is provided a system for antenna beam selection in a radio access network, the system comprising: a measurement module configured to obtain channel quality measurements of a plurality of beams usable to serve a user equipment in the radio access network; a training module coupled to the measurement module, wherein the training module is configured to generate a machine learning model based on the channel quality measurements; and a prediction module coupled to the training module, wherein the prediction module is configured to: receive the machine learning model from the training module, and select, based on the machine learning model, one of the plurality of beams used to serve the user equipment.

The system therefore provides for a near-optimal selection algorithm which uses machine learning techniques for selecting the best beam which is to be used to serve the user equipment.

The measurement module may, in some examples, be configured to conduct the channel quality measurements itself. In some other examples, the measurement module may be configured to collect the channel quality measurements which themselves are conducted by another unit which may or may not be integral to the system for antenna beam selection as described herein.

In one variant of the system, the training module is located in a cloud environment. The algorithm may hereby be split into two parts in order for it to be deployed feasibly given existing hardware and software resources in a system, such as, but not limited to a 5G system, taking into account the limited resources on the radio hardware boards and the availability of more compute resources in the cloud, such as, but not limited to a 5G cloud.

In some embodiments, the prediction module may be comprised in a radio unit, such as, for example, a 5G radio unit. It is to be noted that the system will not only be applicable for a 5G radio unit. Therefore, any reference in the present disclosure to a 5G radio unit, 5G baseband processing unit or other 5G-related implementations are equally applicable in other generation systems.

In some embodiments, the measurement module is configured to obtain and provide to the training module, during a training phase, all channel quality measurements of the plurality of beams, wherein the training module is configured to update the machine learning model based on all channel quality measurements of the plurality of beams received from the measurement module. The machine learning model may hereby be updated, for example, continuously during the training phase.

In some variants of the system, the prediction module is further configured to: continuously determine whether a new machine learning model is received from the training module, and when the channel quality measurements are obtained by the measurement module (which the measurement module may, in some examples, receive from the user equipment): send a request to the measurement module to provide, to the prediction module, channel quality of a subset of the plurality of beams, predict the selected beam based on the channel quality of the subset of the plurality of beams by feeding the channel quality measurements into the machine learning model, and output the selected beam to cause a baseband processing unit (BPU) (such as, but not limited to a 5G BPU) to switch its connection with the user equipment to the selected beam.

The prediction module may hereby request reference beam measurements corresponding to the subset of the plurality of beams which may be needed as model input, whereby the prediction module then provides the predicted best beam as the output. Based on the prediction, the baseband processing unit may then switch (handover) the connection according to the received target beam ID.

In some variants, the prediction module may further be configured to perform the sending of the request to the measurement module to provide, to the prediction module, channel quality of the subset of the plurality of beams, the predicting of the selected beam based on the channel quality of the subset of the plurality of beams and the outputting of the selected beam to cause the baseband processing unit to switch its connection with the user equipment to the selected beam until a time period, starting from the new machine learning model being received by the prediction module, exceeds a predetermined threshold time period. Information regarding the predicted best beam may then be updated continuously and sent to the baseband processing unit, which may be a 5G baseband processing unit.

In some variants, the prediction module is further configured to: periodically determine accuracy of the machine learning model received from the training module, and if the accuracy is larger than a threshold accuracy, send a measurement inactivation command to the measurement module to inactivate channel quality measurements to be obtained of beams not comprised in the subset of the plurality of beams, and if the accuracy is smaller than the threshold accuracy, send an accuracy warning report to the training module to cause the training module to refine the machine learning model. This procedure may be important as the accuracy of the model may degrade due to, for example, a changing layout (for example a new building has been built), a newly set up network, weather or seasonal reasons/changes, or other conditional changes.

In a further variant, the prediction module is further configured to perform the determination of accuracy of the machine learning model by: measuring the channel quality of each of the plurality of beams, and comparing the outcome of the measurement of the channel quality of each of the plurality of beams with the machine learning model received from the training module. The direct comparison between the measurements of the channel quality of each of the plurality of beams with the output of the machine learning model may thereby allow for further refinement of the machine learning model by the training module.

In a further variant of the system, the prediction module is configured to perform the determination of accuracy of the machine learning model and the selection of the beam used to serve the user equipment on separate threads. Interference between the accuracy check of the machine learning model and the periodic prediction task main thread may hereby be avoided.

In some variants, the system is configured to select the subset from the plurality of beams such that the beams of the subset cover a substantially uniform area of the plurality of beams. This may allow, for example, for improving the accuracy check of the machine learning model.

In some further variants of the system, during a prediction phase, the prediction of the selected beam by the prediction module is based only on the channel quality of the subset of the plurality of beams. In some examples, in which the measurement module is configured to obtain and provide to the training module, during the training phase, all channel quality measurements of the plurality of beams, and wherein the training module is configured to update the machine learning model based on all channel quality measurements of the plurality of beams received from the measurement module, the system may be configured to switch between the training phase and the prediction phase. This may allow for the system to generate from a multiple switching between the training phase and the prediction phase a heuristic model usable to predict the beam with the highest channel quality among the plurality of beams.

In some further variants of the system, the training module is configured to generate the machine learning model based on channel quality measurements associated with a plurality of user equipment in the radio access network, which may be a 5G radio access network. The machine learning model may hereby, for example, be generated in a shorter amount of time.

In a further variant, the system further comprises a monitoring module configured to continuously monitor performance metrics obtained via one or both of the prediction module and the training module. The monitoring module may hereby be used to continuously monitor the proposed algorithm in order to calculate and visualize some important performance metrics, such as, but not limited to the performance reports from the prediction module sent after each prediction which may contain information on the accuracy of the actual prediction, the delay of the prediction, and other performance metrics.

In some variants, the training module is further configured to generate the machine learning model based on channel quality measurements obtained from a portion of the plurality of beams. This may allow for aggregation of the channel quality measurements. For example, the machine learning model may be calculated for those beam IDs that are most often seen as the dominant beam IDs by the reporting user equipment, or, in some instances, one model per beam may be calculated.

In a further variant of the system, the training module is further configured to determine whether a machine learning model is available in its database which was generated earlier, and if no machine learning model is available in its database, the training module is configured to activate, by sending an activation request to the measurement module, the channel quality measurements to be obtained by the measurement module of the plurality of beams if the channel quality measurements have not yet been activated. This may allow for making use of a machine learning model which has been generated earlier in order to start the prediction process. Furthermore, channel quality measurements may only be performed, in some scenarios, in order to start the machine learning model generation process and the prediction process if no machine learning model has been generated earlier and stored in the training module database, thereby reducing the required channel quality measurements performed by the terminal.

In some variants of the system, the training module is further configured to control the number of channel quality measurements to be obtained by the measurement module for the training module to be able to generate the machine learning model. This may allow for only so many channel quality measurements to be performed which are needed for the training module to be able to generate the machine learning model.

In further variants of the system, the training module is further configured to: determine accuracy of the machine learning model, and if accuracy of the machine learning model is below a predetermined threshold, collect further channel quality measurements for generating the machine learning model, and if accuracy of the machine learning model is above the predetermined threshold, send the machine learning model to the prediction module. The training module may hereby be coupled to the measurement module such that the training module can directly control the measurement module to obtain further channel quality measurements if accuracy of the machine learning model is below the predetermined threshold. Furthermore, accuracy of the prediction by the prediction module may be enhanced or at least maintained as a (in some cases an updated) machine learning model is only sent from the training module to the prediction module if accuracy of the machine learning model is above the predetermined threshold. It is to be noted that the predetermined threshold of the machine learning model may hereby be identical to the threshold accuracy described above.

In a further variant of the system, the training module is further configured to send a measurement inactivation command to the measurement module to inactivate channel quality measurements to be obtained if accuracy of the machine learning model is above the predetermined threshold.

In one variant, the system is further configured to create different machine learning models for different corresponding, respective cell sites of the radio access network, and select one of the machine learning models based on a location of the user equipment in one of the cell sites or a set of cells to predict the beam with the highest channel quality among the plurality of beams. One cell may hereby belong to multiple models so that overlaps between the models are provided which may result in approved overall prediction accuracy.

In a related aspect of the present disclosure, there is provided a method for antenna beam selection in a radio access network (which may be a 5G radio access network), the method comprising: obtaining channel quality measurements of a plurality of beams useable to serve a user equipment in the radio access network; generating a machine learning model based on the channel quality measurements; and selecting, based on the machine learning model, one of the plurality of beams to serve the user equipment.

Variants of the method for antenna beam selection in a radio access network correspond to those variants as described above with regard to the system for antenna beam selection in a radio access network. In particular, generating the machine learning model based on the channel quality measurements may be performed in a cloud environment. Predicting the best (i.e. highest channel quality) beam which is selected, based on the machine learning model, to serve the user equipment may be performed in a radio unit (which may be a 5G radio unit).

In a further related aspect of the present disclosure, there is provided a computer program product comprising program code portions for performing the method or variants of the method as described above when the computer program product is executed on one or more computing devices. The computer program product may hereby be stored on a computer-readable recording medium.

BRIEF DESCRIPTION OF THE DRAWINGS

These and other aspects of the present disclosure will now be further described, by way of example only, with reference to the accompanying figures, wherein like reference numerals refer to like parts, and in which.

DETAILED DESCRIPTION

The near-optimal beam selection algorithm presented herein uses machine learning techniques to significantly reduce the number of channel quality measurements required to select the best beam for the user equipment. The algorithm is, in some examples, split into two parts in order for it to be deployed feasibly given the existing hardware and software resources in a 5G system, taking into account the limited resources on the radio hardware boards and the availability of more compute resources in the 5G cloud.

Figure 1:
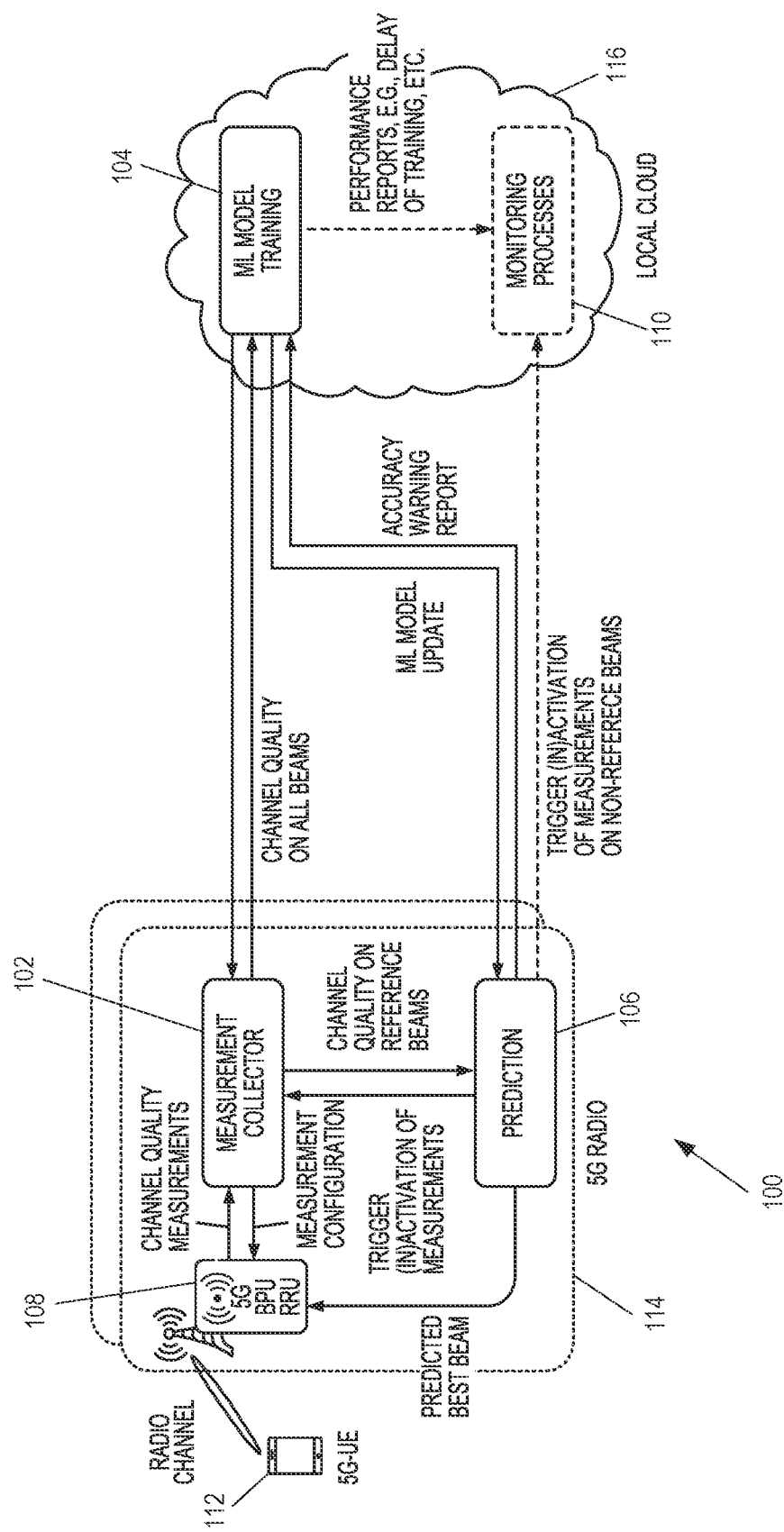
FIG. 1 shows a schematic block diagram of a cloud-based antenna beam selection system according to variants of the present disclosure.

FIG. 1 shows a schematic block diagram of a cloud-based antenna beam selection system 100 according to variants of the system as described herein.

As illustrated in FIG. 1, the algorithm runs in a distributed way, meaning that the machine learning model training part can be deployed in the 5G cloud where computing resources (Central Processing Unit (CPU) and memory) are typically not limited, while the model execution can be deployed on the 5G radio board, which enables basically zero propagation delay between the prediction and execution of the predicted action in the 5G radio unit. Thereby, the algorithm can achieve millisecond-level beam selection which makes it possible to be applied in the fast control loop of the beam selection algorithm, without requiring additional compute resources on the 5G radio hardware.

In this example, the system 100 comprises a measurement module 102 (denoted "measurement collector" in FIG. 1) which is configured to obtain channel quality measurements of a plurality of beams usable to serve a user equipment 112 in the 5G radio access network. The channel quality measurements are provided to the measurement module 102 by the 5G baseband processing unit 108, which is, in this example, configured as a remote radio unit. At the same time, the measurement module 102 is configured to control the measurement configuration of the 5G baseband processing unit 108.

The system 100 further comprises a training module 104 (denoted "ML model training" in FIG. 1) which is coupled to the measurement module 102. The training module 104 is configured to receive channel quality information on all beams from the measurement module 102. This allows the training module 104 to generate a machine learning model based on the channel quality measurements. The training module 104 is, in this example, further configured to trigger (in)activation of measurements on non-reference beams, as will be further described in more detail below.

The system 100 further comprises a prediction module 106 (denoted "Prediction" in FIG. 1) which is coupled, in this example, to each of the training module 104 and the measurement module 102. The coupling of the prediction module 106 to the training module 104 allows for the prediction module 106 to receive a machine learning model update from the training module 104. At the same time, the prediction module 106 is, in this example, configured to send an accuracy warning report to the training module 104 in case accuracy of the machine learning model drops or is below a certain predetermined threshold.

In this example, the system 100 further comprises a monitoring module 110 (denoted "Monitoring processes" in FIG. 1), which is generally optional, coupled to each of the training module 104 and the prediction module 106. In this example, the training module 104 provides the monitoring module 110 with performance reports regarding, for example, delay of training and other performance metrics. The prediction module 106 provides the monitoring module 110, in this example, with performance reports regarding, for example, accuracy and delay of prediction and other performance metrics.

In this example, the prediction module 106 is coupled to the measurement module 102, whereby the prediction module 106 is configured to trigger (in)activation of measurements obtained by the measurement module 102. At the same time, the measurement module 102 is configured to provide channel quality on reference beams to the prediction module 106, as will be further described in detail below.

Based on the machine learning model received by the prediction module 106 from the training module 104, the prediction module 106 can select one of the plurality of beams which is then used to serve the user equipment 112. In this example, the information of the hereby predicted best (highest-quality) beam is provided by the prediction module 106 to the 5G baseband processing unit 108.

The 5G baseband processing unit 108 may then switch, if necessary, its communication channel with the user equipment 112 to the highest-quality beam as predicted by the prediction module 106.

In this example, the 5G baseband processing unit 108, the measurement module 102 and the prediction module 106 are comprised in a 5G radio unit 114.

Furthermore, in this example, the training module 104 and the monitoring module 110 are comprised in a local cloud (cloud environment 116).

As can be seen from the above, FIG. 1 illustrates the block diagram of the beam selection system 100 which consists of the three main components of the measurement module 102, the training module 104 and the prediction module 106.

In the case of beam selection, what may need to be learned is the relationship of the beams through channel quality measurements. One may assume that M beams $Beam_0, \ldots, Beam_{M-1}$ are available, and out of these M beams only a subset is measured, which is the set of reference beams. In other words, one needs to find a predictor function that, for example, can return the channel quality on $Beam_0$, if the channel quality $Q_{R1}$ on reference beam $Beam_{R1}$ and the channel quality $Q_{R2}$ on reference beam $Beam_{R2}$ are measured. Accuracy of the learned function largely depends on the selected input feature representations. The features may be selected such that they best describe the problem, i.e., they preferably comprise enough information on the output in order to achieve high accuracy in prediction. In this case, for the input features one can define a vector as $[Q_{R0}, Q_{R1}, \ldots, Q_{RN}]$, where $Q_{RN}$ denotes the channel quality measured on reference beam $Beam_n$. The reference beams may always be switched on and be continuously measured in terms of channel quality.

The reference beams may be selected arbitrarily. However, in this example, the reference beams are selected such that the coverage area of all beams is uniformly covered by the reference beams in order to sample the channel quality from the area more or less uniformly. The actual selected reference beams and the number of reference beams may have a direct impact on accuracy of the machine learning model.

The labelled target value is, in this example, the ID of the beam where channel quality is measured to be the highest. Since the training dataset can be generated, in some instances, together with the labelled output, supervised learning algorithms may be applied to the above-defined problem.

Figure 2:
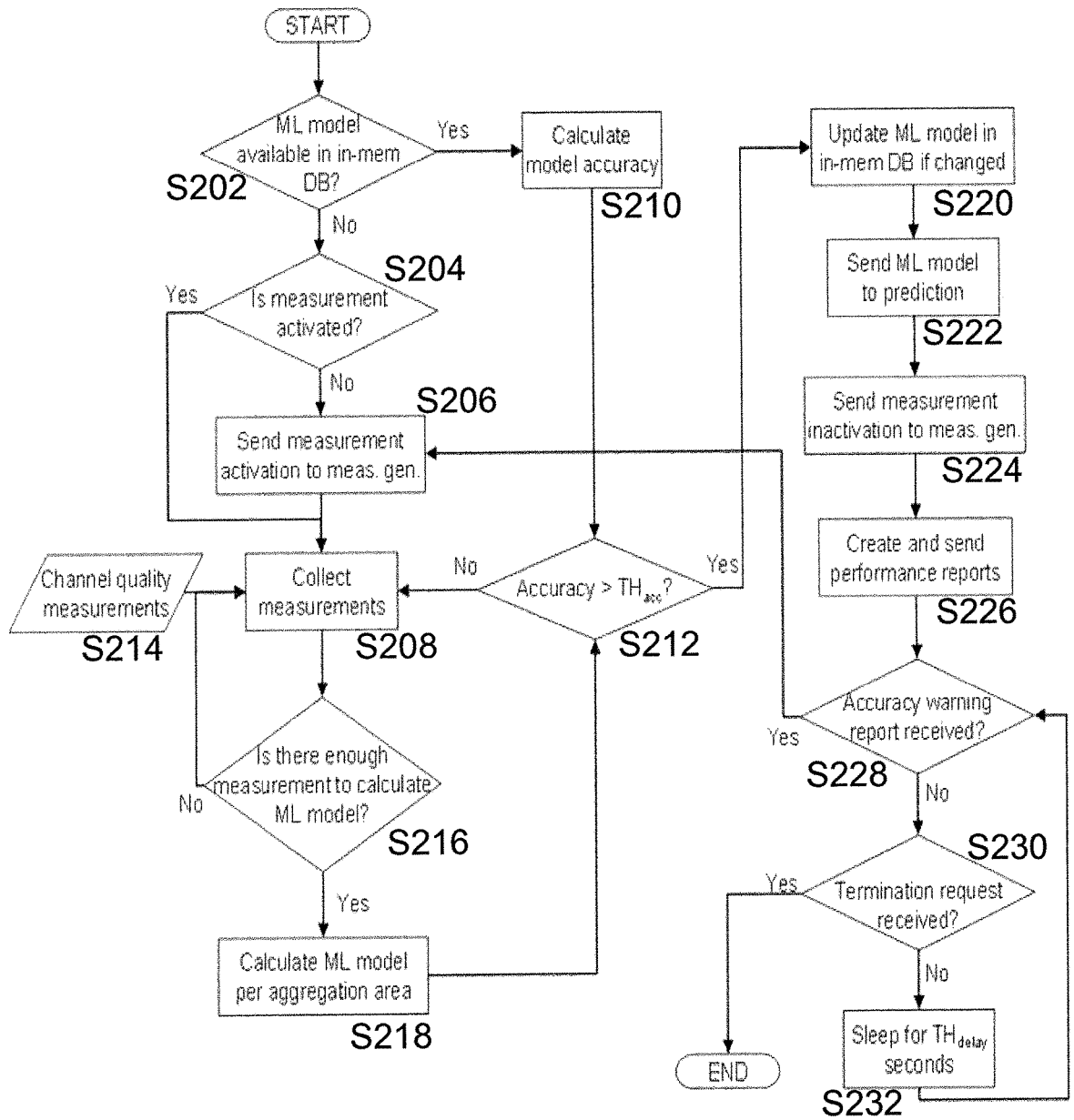
FIG. 2 shows a flowchart of a machine learning model training algorithm according to variants of the present disclosure.

FIG. 2 shows a flowchart 200 of a machine learning model training algorithm according to variants as described herein. In this example, the machine learning model training algorithm runs in a local cloud.

Once the process has started, the training module 104 first checks at step S202 whether a machine learning model is available in its database (which may be stored in its memory) which was calculated earlier. If a machine learning model is available in its database, the training module 104 calculates the model accuracy at step S210. From there, the training module 104 determines as to whether the accuracy is above a predetermined threshold at step S212. If the accuracy is above the predetermined threshold, the machine learning model is updated at step S220 in the memory of the training module 104 if it changed. However, if the accuracy is below the predetermined threshold as determined at step S212, the training module 104 collects more measurements at step S208 which are used to generate the machine learning model.

If it is determined by the training module 104 at step S202 that no machine learning model is available in its database, it activates the channel quality measurements on all beams at step S206 if they are determined at step S204 to not yet be activated. The training module 104 hereby sends an activation request at step S206 to the measurement generator which may be coupled to or comprised in the measurement module 102. After this, the training module 104 collects as many measurements at step S208 as are needed in order for it to be able to calculate (in some instances a first version of) the machine learning model. If it is determined at step S204 that the channel quality measurements are activated, the training module 104 goes straight to step S208 where it collects channel quality measurements needed to generate the machine learning model. As shown in FIG. 2, the training module 104 hereby obtains the channel quality measurements at step S214 from the measurement module 102.

After or while measurements are collected at step S208 by the training module 104, it determines at step S216 as to whether it has collected enough measurements in order for it to be able to calculate the machine learning model. If this is not the case, the training module 104 collects further measurements as outlined above regarding step S208 until enough measurements have been collected by the training module 104 so that it can generate the machine learning model.

Once enough measurements have been collected by the training module 104 to calculate the machine learning model, the training module 104 calculates the machine learning model per aggregation area at step S218. After that, the training module 104 determines as to whether accuracy of the machine learning model is above a predetermined threshold at step S212, as outlined above. If this is not the case, the training module 104 goes back to step S208 to collect more channel quality measurements. If however accuracy is above the threshold, as outlined above, the training module 104 updates the machine learning model in its database at step S220 if the machine learning model has changed.

The training module 104 then sends the machine learning model to the prediction module 106 at step S222. Furthermore, in this example, the training module 104 sends a measurement inactivation command to the measurement generator at step S224.

In this example, the training module 104 then creates and sends the above-described performance reports at step S226 to the monitoring module 110.

In this example, the training module 104 determines at step S228 whether it has received an accuracy warning report from the prediction module 106. If this is a case, the training module 104 goes back to step S206 in order to send a measurement activation command to the measurement generator such that more channel quality measurements can be collected by the training module 104 as described above with regard to step S208.

If however no accuracy warning report is determined at step S228 to have been received by the training module 104 from the prediction module 106, the training module 104 determines at step S230 as to whether a termination request is received. If this is the case, the machine learning model training algorithm process in the local cloud ends. However, if no termination request is received, the training module 104 is sent to sleep for a predetermined time period. Once this time period has elapsed, the training module 104 goes back to step S228 where it determines as to whether an accuracy warning report has been received from the prediction module 106.

As can be seen, the algorithm splits to collected data (channel quality on reference beams) into training and testing parts. It builds the machine learning model using the training part and then checks the accuracy of the trained model using the testing dataset. One machine learning model is calculated per aggregation area in this example. One aggregation area can, for example, be the measurements that belong to the beams of one 5G radio unit. This case is illustrated in FIG. 1. Other separations of the measurements are also possible, as will be further described below.

The ML model may be created using various supervised machine learning algorithms, for example, an ensemble learning algorithm (for example, random forest classifier https://en.wikipedia.org/wiki/Random_forest, or gradient boosting classifier https://en.wikipedia.org/wiki/Gradient_boosting) or neural network based approaches (for example Multilayer perception (MLP) method https://en.wikipedia.org/wiki/Multilayer_perceptron). Common to these learning algorithms is that they are deriving the functional relationship between a set of input variables (i.e., the set of reference beams, the [QR0, QR1, . . . , QRN] vector in the present case) and a set of output variables (i.e., the best beam) based on observation of a large set of reference data. The reference data in the case as described herein means the measurement samples of all the beams collected during the learning, i.e., measurement collection phase. The different machine learning methods differ in terms of the algorithmic details how they calculate this functional relationship between the set of input variables and set of output variables. The present disclosure hereby focuses on how to apply such algorithms in the particular context of, for example, 5G beamforming, how to realize and implement it in this context.

Then, once the model is learnt from the reference data, i.e., the functional relationship between input and output variables has been established, the model can be used for prediction. The learnt function is applied and the current input variables (i.e., the measured reference beam vector [QR0, QR1, . . . , QRN]) are substituted into the function to get the desired output variable (i.e., the ID of the best beam).

In this example, after the machine learning model is calculated with at least the threshold accuracy, $TH_{acc}$, (for example, $TH_{acc}$ can be set to 95% of a perfect accuracy), the machine learning model is stored, in this example, in a persisted (in-memory) database in case the machine learning training process is restarted. If there is a model available in the database with greater than $TH_{acc}$ accuracy, then there is no need to recalculate the model. Then, the model is sent to the prediction module 106 running on the 5G radio board (unit) and the machine learning training process inactivates the measurements on all beams by sending a request to the measurement module 102. As described above, after this, it listens for any accuracy warning report from the prediction process. This report informs the machine learning training process that the prediction module 106 noticed accuracy degradation of the latest model used for prediction. As the training module 104 receives such a report, it immediately tries to build a more accurate model by re-executing the necessary steps (the ones described above regarding the measurement activation). The machine learning model training process is running, in this example, in the local cloud, since it requires a relatively large amount of compute and memory resources that are typically available in the cloud environment, but are not available on, for example, a network node that is designed to have dedicated hardware resources.

Figure 3:
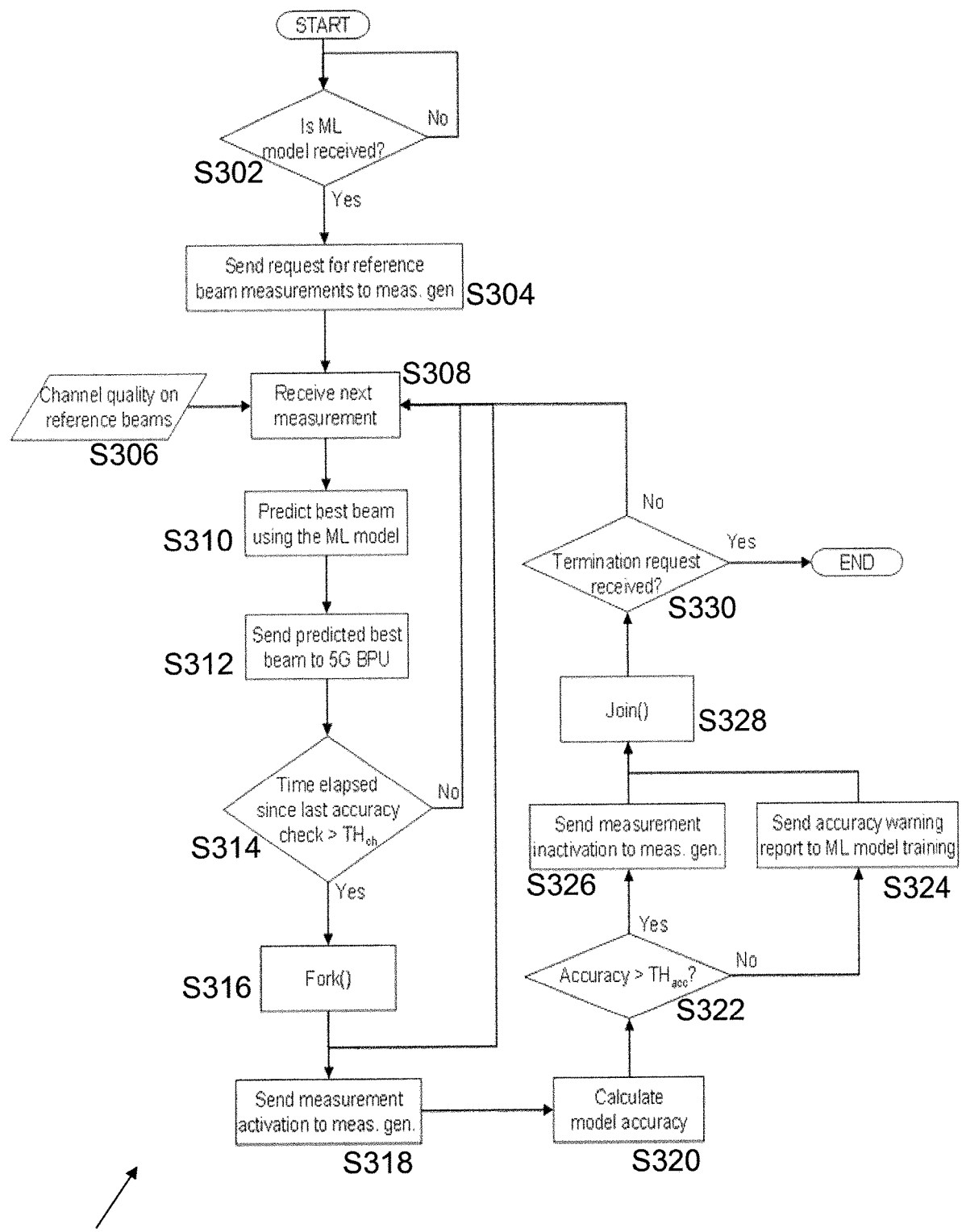
FIG. 3 shows a flowchart of a prediction algorithm according to variants of the present disclosure.

FIG. 3 illustrates a flowchart 300 of the prediction algorithm running, in this example, in the 5G radio unit as described herein.

Once the prediction algorithm has started, the prediction module 106 determines at step S302 as to whether a machine learning model is received from the training module 104. If this is not the case, the prediction module 106 continuously performs this determination at step S302.

Once a machine learning model is received from the training module 104 at the prediction module 106, the prediction module 106 sends a request for reference beam measurements to the measurement generator at step S304. As outlined above, the measurement generator may be coupled to or comprised in the measurement module 102.

At step S308, the prediction module 106 receives further channel quality measurements. These channel quality measurements on reference beams are provided to the prediction module 106 by the measurement module 102 at step S306.

The prediction module 106 then predicts at step S310 the best (i.e. highest-quality) beam using the machine learning model received from the training module 104. The prediction module 106 then sends, at step S312, information regarding the best beam to the 5G baseband processing unit 108.

The prediction module 106 then determines at step S314 as to whether the time elapsed since the last accuracy check is larger than a predetermined threshold. If this is not the case, the prediction module 106 goes back to step S308 where it receives further channel quality measurements on reference beams.

If however the time elapsed since the last accuracy check is larger than the predetermined threshold, the prediction algorithm forks at step S316. On the one hand, the prediction algorithm continues with step S308 at which the prediction module 106 receives further channel quality measurements. On the other hand, the prediction module 106 sends a measurement activation command at step S318 to the measurement generator.

The prediction module 106 then calculates the machine learning model accuracy at step S320. The prediction module 106 then determines at step S322 based on the calculated machine learning model accuracy as to whether the accuracy is above or below a predetermined threshold accuracy. If this is not the case, the prediction module 106 sends an accuracy warning report to the training module 104 at step S324. If however the accuracy is above the predetermined threshold accuracy, the prediction module 106 sends a measurement inactivation command at step S326 to the measurement generator. The processes of sending the measurement inactivation command to the measurement generator at step S326 and the process of sending an accuracy warning report to the training module 104 at step S324 join a further process common to both scenarios at step S328.

The prediction module 106 then determines at step S330 as to whether a termination request has been received. If this is the case, the prediction algorithm process ends. However, if no termination request is determined at step S330 to have been received by the prediction module 106, the process returns to step S308 at which further channel quality measurements are received by the prediction module 106.

As can be seen from the above, the prediction process is responsible for executing the trained model each time a new channel quality measurement of the reference beams arrives from a user equipment. Since the covered area of a beam is relatively small compared to, for example, the traditional omni or 3-sector antennas, the selection of the best available beam (i.e. the one with the highest quality) preferably runs on a much lower timescale (~5-10 msec) compared to traditional handover among cells (~200-300 msec). As the distributed cloud platform as described herein enables deploying and executing processes remotely, for instance, on network nodes (i.e., on the 5G radio board), propagation delay can be minimized compared to a scenario in which prediction is sent directly from the cloud to the network nodes.

As outlined above, the prediction process continuously checks whether a new machine learning model has been sent by the training module in the cloud. If the model is received, the prediction module requests the reference beam measurements that are needed as model input and then provides the predicted best beam ID as the output. Based on the prediction, the 5G baseband processing unit module switches (handovers) the connection according to the received target beam ID. The predictor module periodically (every $Th_{ch}$ (threshold check) seconds) checks the accuracy of the model. In order to do this, the prediction module needs to know the ground truth, i.e., it needs to measure the channel quality on all beams and then calculate the accuracy of the machine learning model by measuring the true best beam (i.e. the beam with the highest quality) and comparing it to the output of the training module.

There may also be alternative ways to measure the accuracy of the model without requiring constant measurement on all the possible beams. For example, degraded signal strength after the beam switch or lost radio connection after the switch can all be an indication of degraded model accuracy. When the ratio of such incidents increases above a threshold, the system could trigger an update of the model, first by initiating measurement collection from all the beams and then calculating the model (according to any of the selected machine learning algorithm).

If the accuracy is high enough, it inactivates the unnecessary beam measurements (on non-reference beams), as outlined above. Otherwise, the prediction module creates and sends an accuracy warning report to the training module to refine the current model. Accuracy of the model can degrade due to, for example, a changed layout (a newly built building), a new network setup, weather or seasonal reasons/changes, and other conditional changes. The model accuracy check and the corresponding computing tasks are, in this example, executed on a separate thread in the implementation compared to the main prediction thread in order not to interfere with the periodic main prediction task thread.

The measurement collector/measurement module 102 is responsible for configuring the necessary radio quality measurements in the 5G baseband processing unit software according to the requests sent by the prediction module 106 and the training module 104. It is designed as a separate module, such that the configuration interface of the radio unit needs to be implemented only once.

The monitoring module 110 is optional, as outlined above, but it may be useful to continuously monitor the proposed algorithm to calculate and visualize some important performance metrics. For instance, the performance reports from the prediction module 106 after each prediction may contain information on the accuracy of the actual prediction, the delay of the prediction, etc.

Figure 4A:
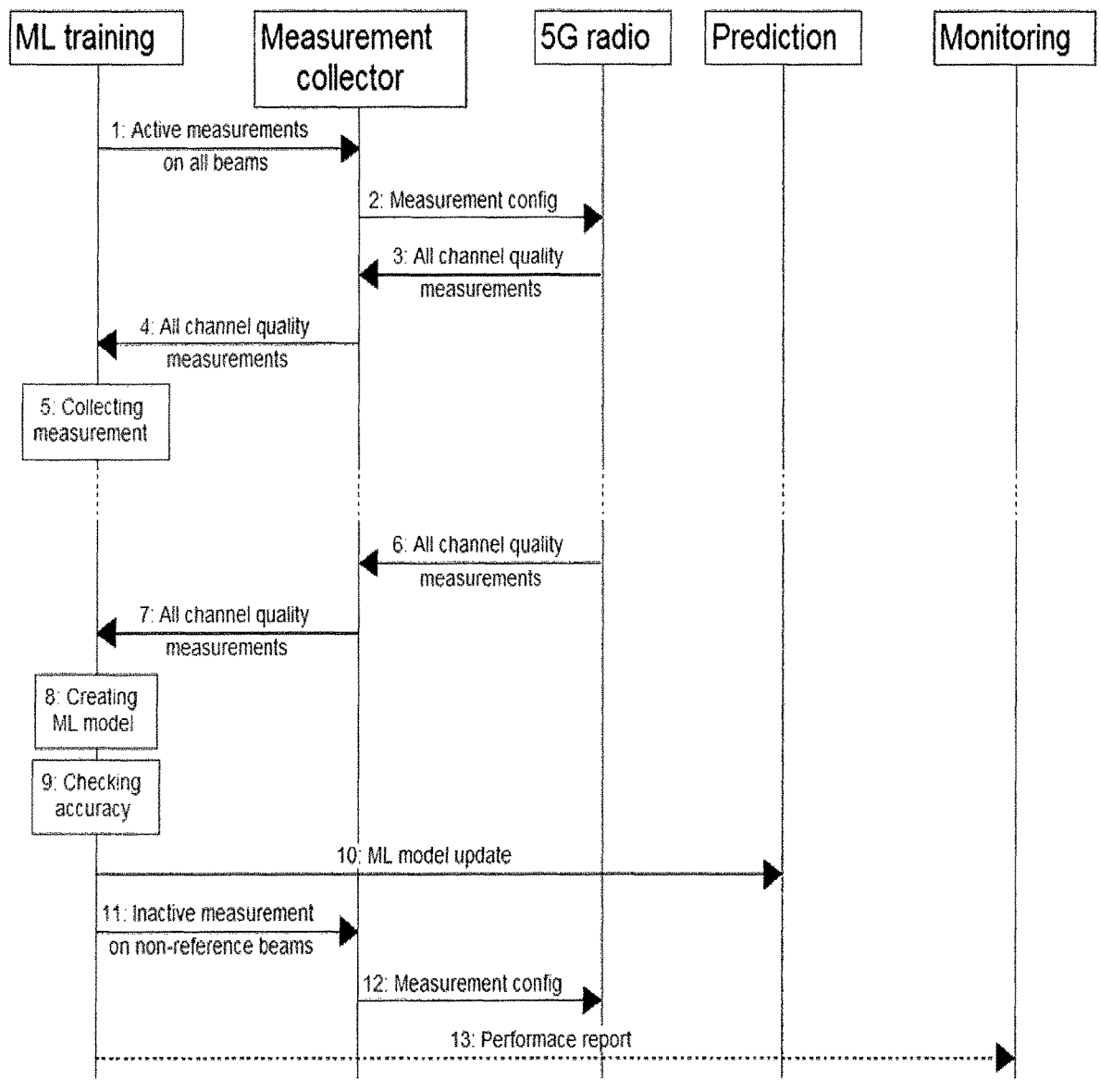
FIGS. 4a and b show a sequence chart of a beam selection algorithm according to variants of the present disclosure.

FIGS. 4a and b illustrate the proposed algorithm in a form of a message sequence diagram 400.

As can be seen, in this example, the training module first activates measurements on all beams to be obtained by the measurement collector. The measurement collector then provides a measurement configuration to the 5G radio unit. In this example, the 5G radio unit then provides all channel quality measurements to the measurement collector, which in turn sends all channel quality measurements to the training module.

The training module then collects the channel quality measurements. Further channel quality measurements are provided from the 5G radio unit to the measurement collector, which are again in turn sent by the measurement collector to the training module. The training module is then able to create the machine learning model. Furthermore, accuracy of the machine learning model is checked.

In this example, the training module then sends the machine learning model update to the prediction module. Furthermore, the training module sends an inactivation measurement command on non-reference beams to the measurement collector. The measurement collector then sends a measurement configuration to the 5G radio unit.

The training module provides a performance report to the monitoring unit, which is an optional process.

Figure 4B:
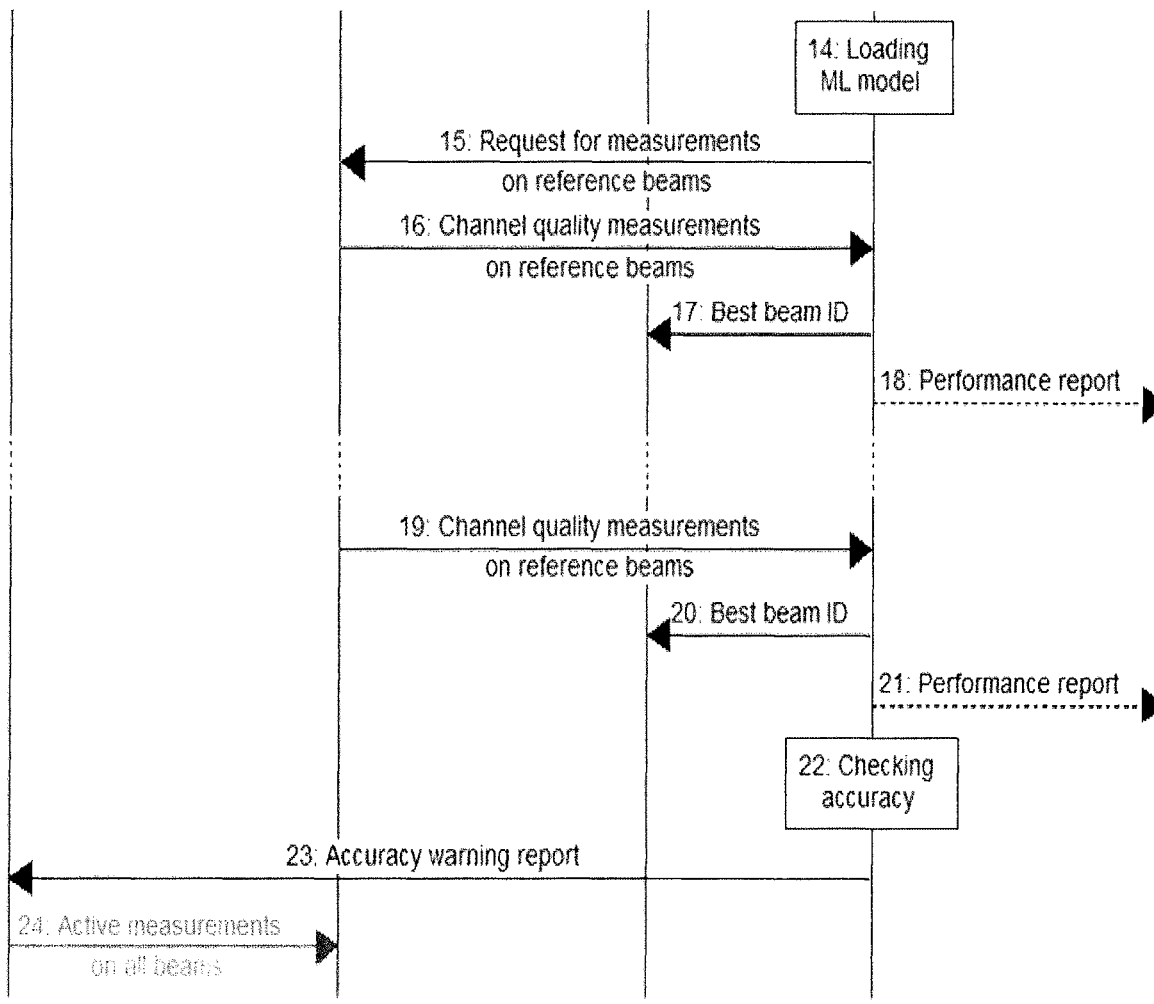

Continuing with the same process, as can be seen in FIG. 4b, in this example, the prediction module then loads the machine learning model. It then sends a request for measurements on reference beams to the measurement collector. The measurement collector then provides the channel quality measurements on reference beams to the prediction module. Based on the above steps, the prediction module then determines the best beam, the ID of which is sent by the prediction module to the 5G radio unit. Furthermore, the prediction module provides a performance report to the monitoring unit (which is optional in this process).

In this example, the measurement collector provides further channel quality measurements on reference beams to the prediction module. Based on the further channel quality measurements on reference beams, the prediction module determines once again the best beam, the ID of which the prediction module sends to the 5G radio unit. A performance report is then sent again from the prediction module to the monitoring module (which is optional).

In this example, the prediction module then checks accuracy of the machine learning model. In case the accuracy is below a predetermined threshold accuracy, the prediction module sends an accuracy warning report to the training module. Based on the accuracy warning report, the training module sends an activation measurement request on all beams to the measurement collector. The process may then be continued as outlined above with regard to step S208 in FIG. 2.

In the sequence chart of FIG. 4, the monitoring module is illustrated as being optional, as outlined above.

As shown in FIG. 4, a case is illustrated when there has not been a machine learning model trained before, so that a new machine learning model is created (step 8 in FIG. 4), and an accuracy warning report needs to be generated by the prediction module (step 23 in FIG. 4), if necessary. The further process from step 23 onwards is the repetition of the previous mechanisms as depicted in FIGS. 2 and 3.

It is to be noted that, as already described above, in FIG. 1 it is assumed that there is one model per 5G site, i.e. one machine learning model is calculated for the set of beams belonging to one site. However, other aggregation of the measurements may be applied. For instance, the machine learning model may be calculated for those beam IDs which are most often seen as, for example, top 10 (or another number of) beam IDs by the reporting user terminal or one model per beam in the extreme case.

Figure 5:
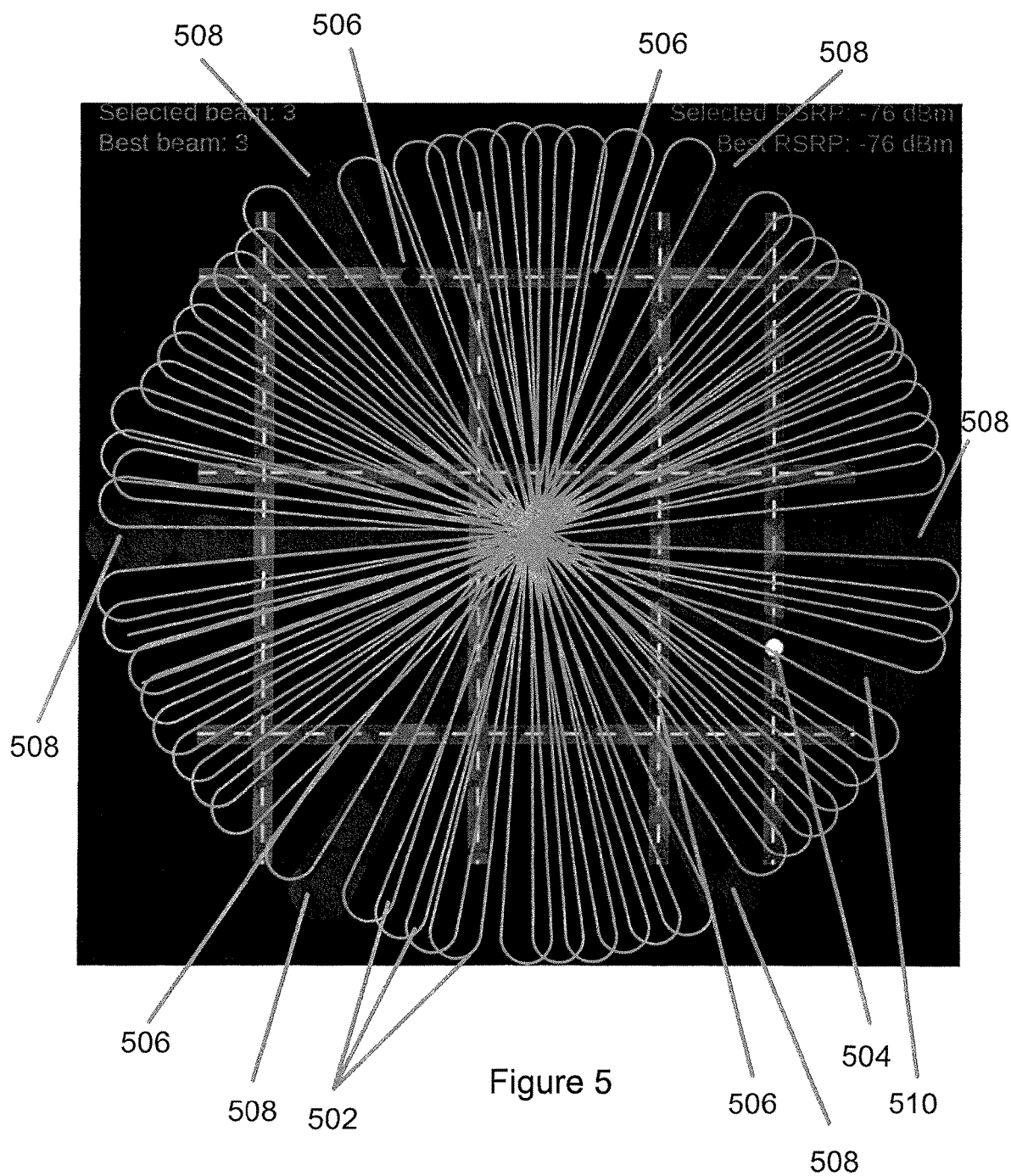
FIG. 5 shows a graphical user interface relating to a beam selection algorithm according to variants of the present disclosure.

FIG. 5 illustrates a graphical user interface (GUI) corresponding to a beam selection algorithm generally as described herein.

In this example, the 5G radio has 48 beams (beams 502, 508 and 510 combined), as illustrated in FIG. 5. The dot 504 represents the tracked user equipment for which the prediction is executed. The beams 508 are, in this example, the six reference beams (i.e. the beams which are, in this example, always switched on and measured) and the other beams 502 out of the 48 beams are the ones that are predicted by the model (the prediction module may select the reference beams 508 in some examples as well). The beam 510 is the actually selected serving beam for the user equipment, according to the prediction.

In this example implementation, the training module is fed by measurements from multiple user equipment 506 and 504 connected to the same 5G radio board. The machine learning model can therefore be generated in a shorter amount of time. All multiple user equipment measure the channel quality on the reference beams, which is fed to the machine learning training process. Although the prediction is executed only for the user equipment 504 in this example, multiple user equipment may be tracked similarly using the same model and algorithm. In the implementation of this example, a Random Forest ensemble learning algorithm for classification from the set of supervised learning algorithms is used. Thus, the machine learning model is a decision tree combined from several other decision trees in this case.

Figure 6:
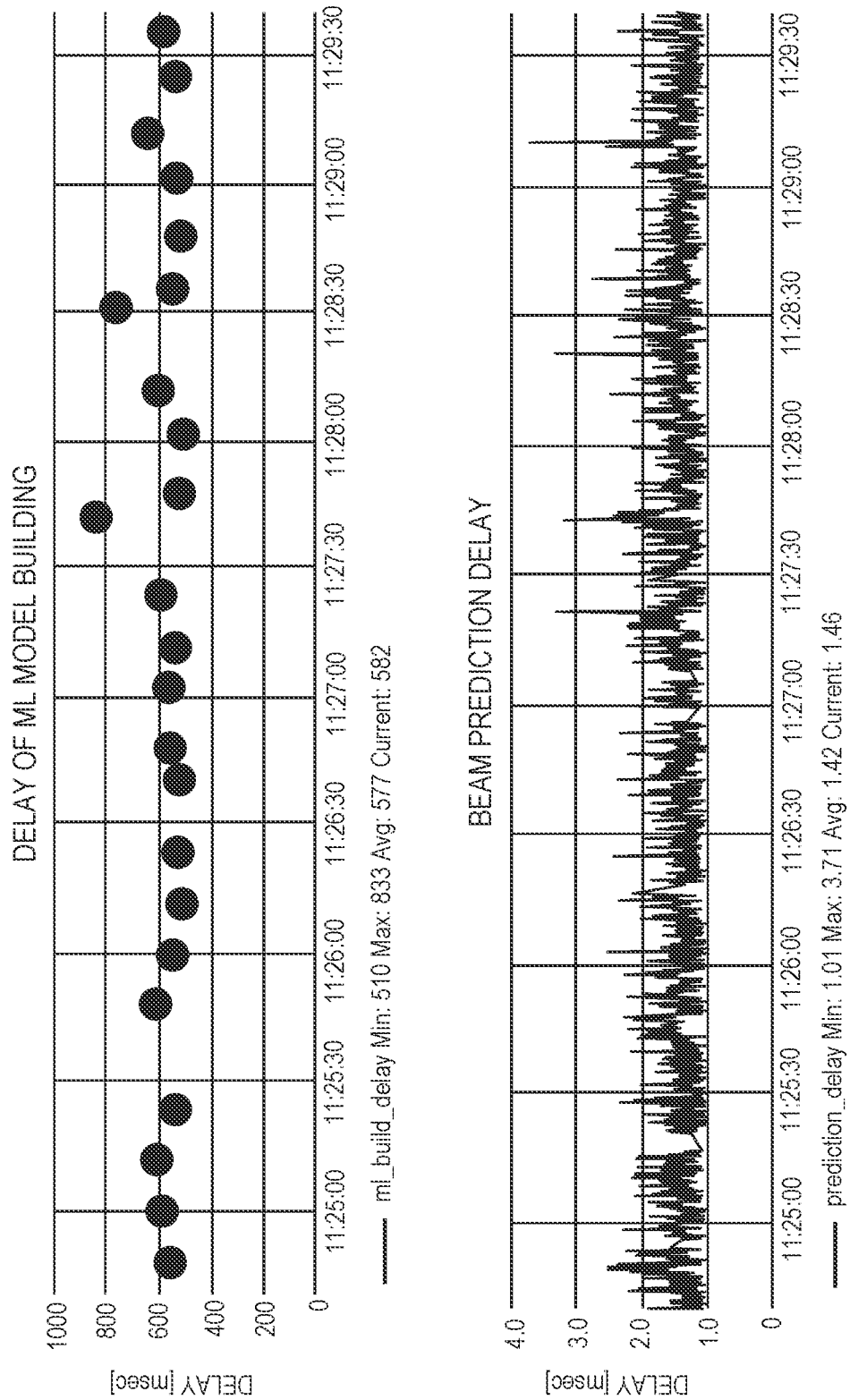
FIG. 6 shows a delay monitoring chart according to variants of the present disclosure.

FIG. 6 illustrates delay monitoring charts including machine learning training and prediction delay.

The delay of one machine learning model computation is illustrated. It can be seen that the delay values (upper chart of FIG. 6) are around 600 msec to 1 second in this example. For illustration purposes, the machine learning model is continuously recalculated regardless of its accuracy in this example.

The lower chart in FIG. 6 shows the delay of the prediction executed in the 5G radio unit. It is about 1.4 msec in average, which means that it is below the 5-10 msec requirement, even if the implementation of the prediction is not optimized for performance in this example.

Figure 7:
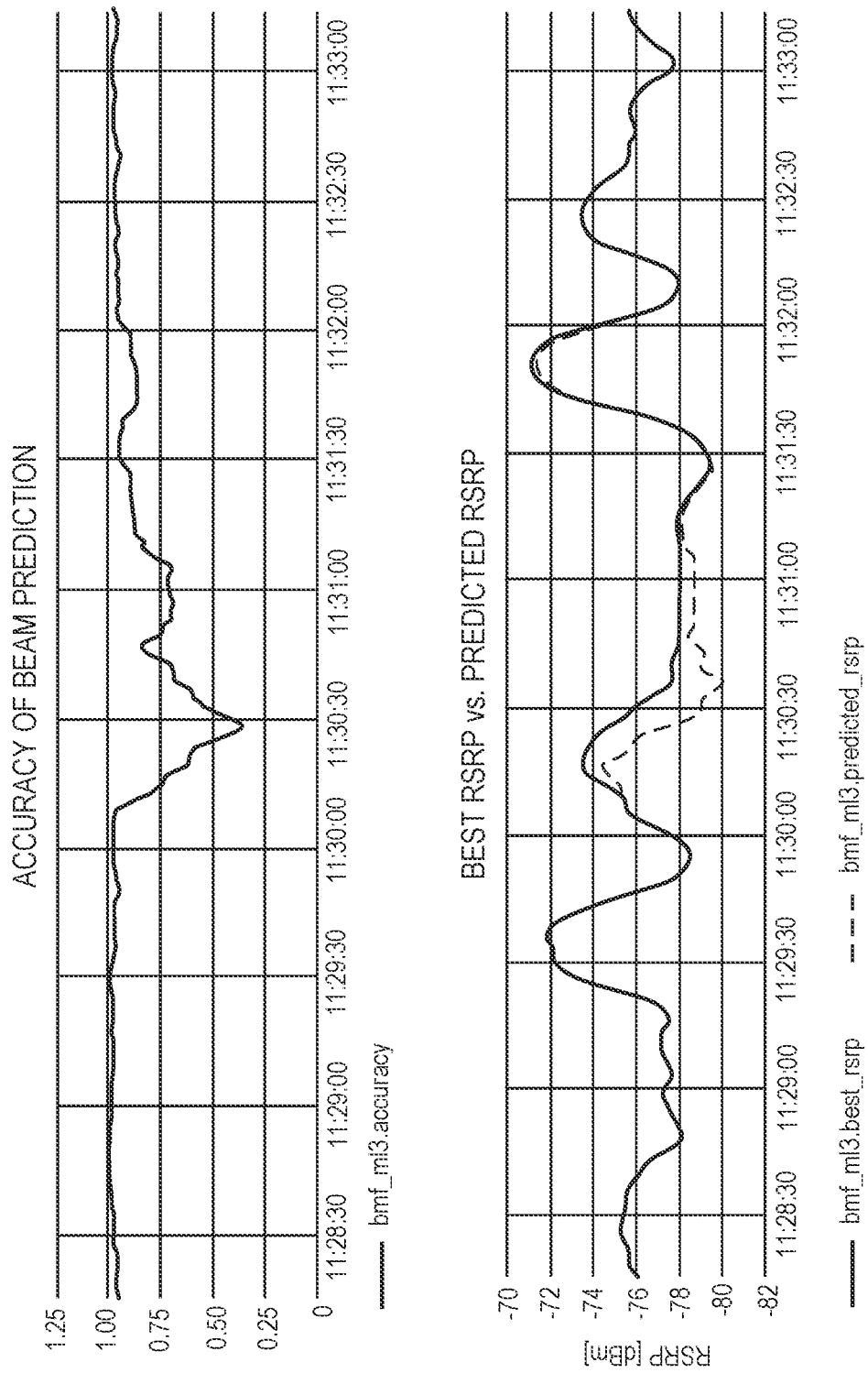
FIG. 7 shows accuracy monitoring charts according to variants of the present disclosure.

FIG. 7 illustrates accuracy monitoring charts of the machine learning model.

The upper chart in FIG. 7 shows that at about 95% of the time the process is being performed, the proposed algorithm selects the true best beam (i.e. the one with the highest channel quality) for the tracked user. In the middle of the charts, and around 11:30:10, the machine learning model training has been restarted in this scenario which caused degradation of accuracy. The accuracy is illustrated in the lower chart as well, where the best channel quality (best Reference Signal Receiver Power, RSRP) in dBm is compared to the channel quality of the beam selected by the algorithm (predicted RSRP). The closer the lines are, the more accurate the machine learning model is.

Figure 8:
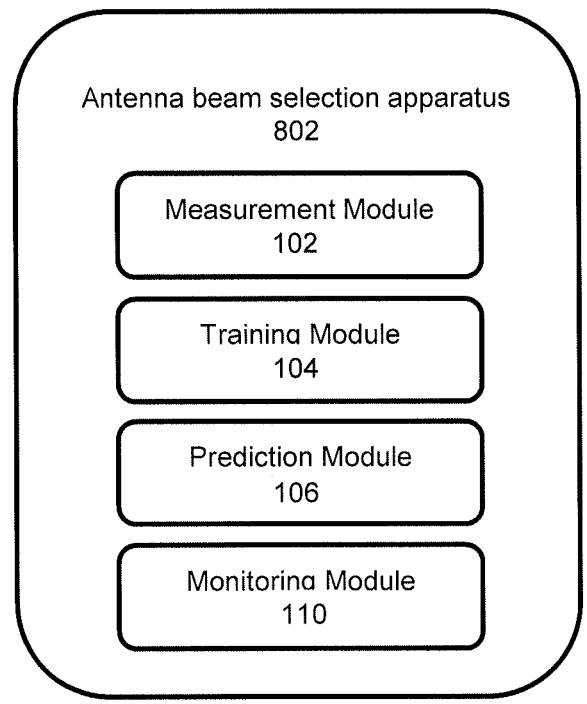
FIG. 8 shows a schematic block-diagram of an antenna beam selection apparatus according to variants of the present disclosure.

In order to realize the above and further functionalities regarding the selection of an antenna beam in a 5G radio access network, an antenna beam selection apparatus 802 is provided in embodiments, as shown in FIG. 8.

The antenna beam selection apparatus 802 comprises a measurement module 102, a training module 104, a prediction module 106 and a monitoring module 110. The modules 102, 104, 106 and 110 may be configured as hardware entities or may be stored as computer program code in one or more memories. As outlined above, in some examples, the training module 104 and the monitoring module 110 may be comprised in a cloud environment.

Figure 9:
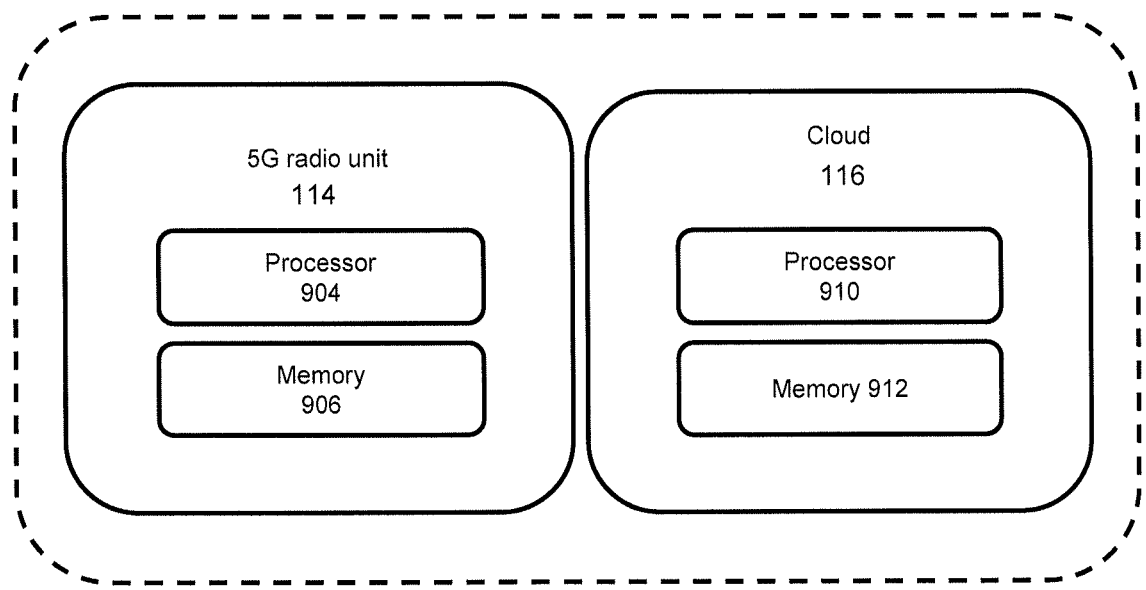
FIG. 9 shows a further schematic block-diagram of a 5G radio unit and a cloud environment according to variants of the present disclosure.

The antenna beam selection apparatus 802 is further shown in FIG. 9, in which the antenna beam selection apparatus 802 comprises a 5G radio unit 114 and a cloud environment 116. The 5G radio unit 114 comprises a processor 904 and a memory 906. The memory 906 is coupled to the processor 904 and comprises program code portions that allow communication from the 5G radio unit 114 to the user equipment 112, obtaining and collecting channel quality measurements, configuring measurements performed by the 5G baseband processing unit 108, forwarding channel quality measurements to the training module 104, obtaining and analyzing channel quality on reference beams, triggering (in)activation of channel quality measurements, predicting the best (highest-quality) beam and switching the 5G baseband processing unit 108 to communicate with the user equipment 112 on the predicted best beam. In embodiments in which a monitoring module 110 is provided, the program code portions further allow performance reports to be sent from the prediction module 106 to the monitoring module 110.

This cloud environment 116 comprises a processor 910 and a memory 912. The memory 912 is coupled to the processor 910 and comprises program code portions that allow processing channel quality measurements received from the 5G radio unit 114, generating a machine learning model and providing the machine learning model to the 5G radio unit 114. In embodiments in which a monitoring module 110 is provided, the program code portions further allow performance reports to be sent by the training module 104 to the monitoring module 110.

Generally, the program code portions comprised in the memories 906 and 912 may allow for any of the processes as described above, in particular with regard to FIGS. 1 to 7, to be performed.

It is to be noted that in embodiments in which the 5G radio unit 114 and the training module 104 (and the optional monitoring module 110) are not physically separated, i.e. in particular in which the training module 104 (and the optional monitoring module 110) is not comprised in a cloud, the processors 904 and 910 may be integral to a single processor and/or the memories 906 and 912 may be integral to a single memory.

Figure 10:
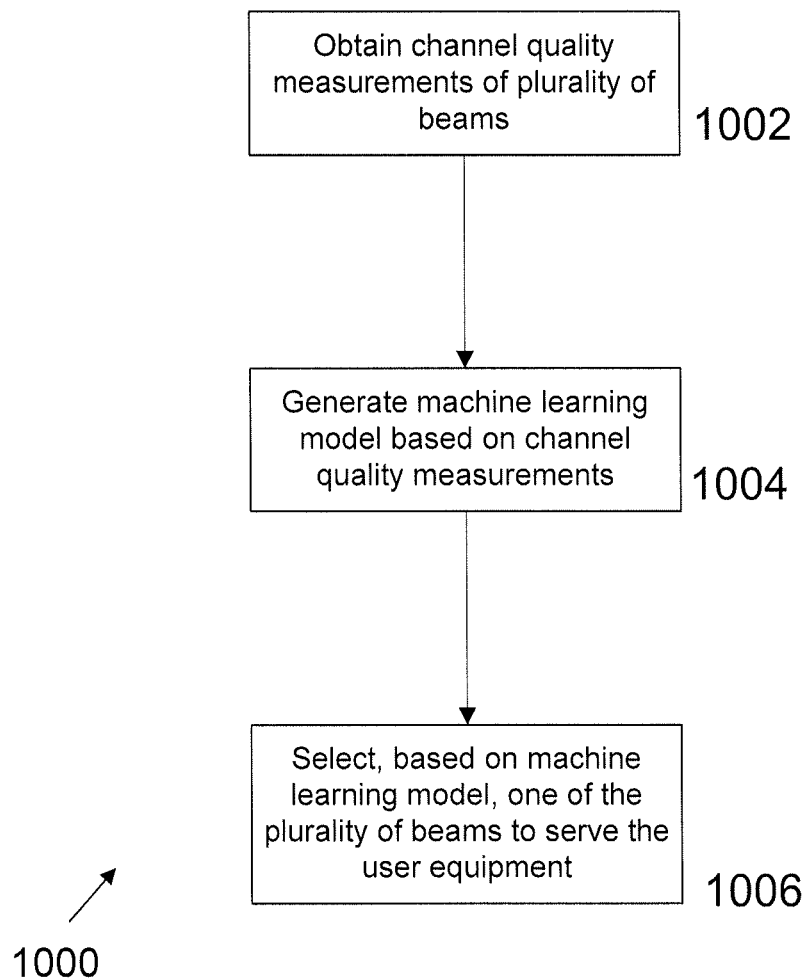
FIG. 10 shows a flowchart of a method for antenna beam selection in a 5G radio access network according to variants of the present disclosure.

FIG. 10 shows a flowchart 1000 of a method for antenna beam selection in a 5G radio access network according to variant as described herein.

At step 1002, channel quality measurements of a plurality of beams usable to serve a user equipment in the 5G radio access network are obtained. At step 1004, the machine learning model is generated based on the channel quality measurements. At step 1006, one of the plurality of beams is selected, based on the machine learning model, to serve the user equipment. In some examples, the generation of the machine learning model is performed in a cloud environment.

As described above, in FIG. 1 it is assumed that there is one model per 5G site, i.e. one machine learning model is calculated for the set of beams belonging to one site. However, other aggregation of the measurements may be applied. For instance, the machine learning model may be calculated for those beam IDs which are most often seen as, for example, top 10 (or another number of) beam IDs by the reporting user terminal or one model per beam in the extreme case.

Figure 11:
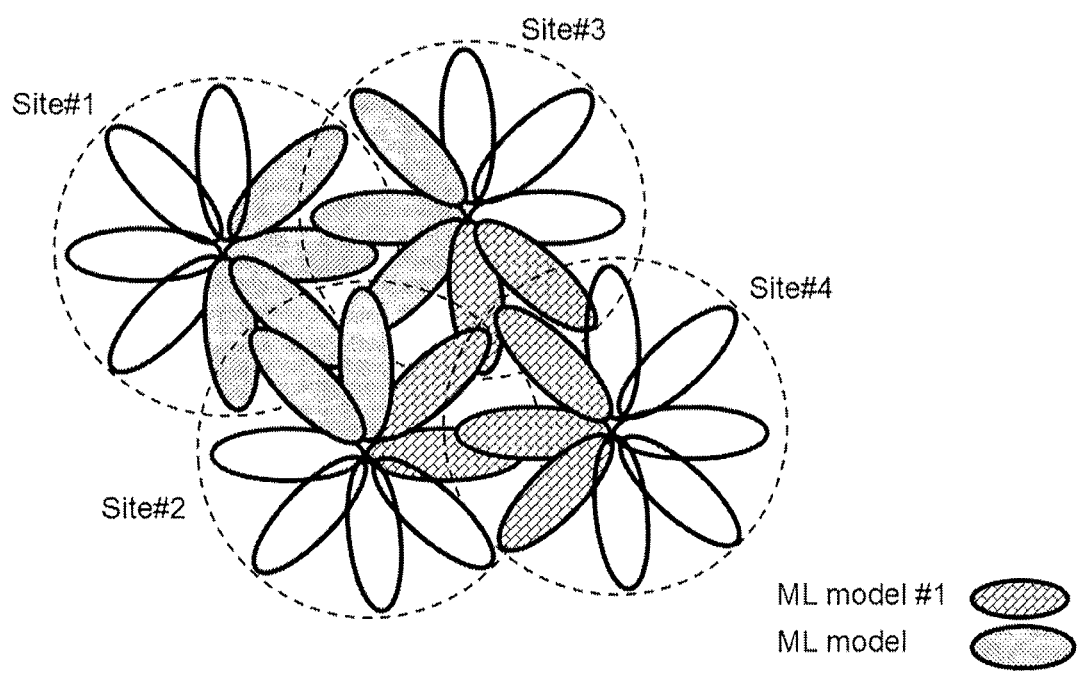
FIG. 11 shows a schematic diagram of model coverage areas according to variants of the present disclosure.

FIG. 11 illustrates an example with multiple cell sites, each having a number of beams serving that site. In the figure, different sets of cells are indicated with different texture types that belong to different ML models. This means that one set of cells with texture type1 is used to create one model (recall that the model creates the relationship between the reference beams in the set and the best beam in that set of cells) and another set of cells with a different texture type constitutes the input parameters of another model. Then, depending in which set of cells the user is currently located, the corresponding model is used to predict the best beam to serve that user.

It is to be noted that one cell may belong to multiple models, so that overlaps between the models are possible (and in some instances necessary) to achieve good or improved overall prediction accuracy.

It is a further sub-method of the proposed solution of how to create these sets of beams that constitute one model. Since there can be many different solutions, i.e., one extreme when there is only one model and all beams belong to that model, it may depend on the weighting of different advantages and disadvantages of a model size in the particular case.

One way could be to use a clustering algorithm (a special category of machine learning algorithms) to determine quasi optimal clusters of cells that constitute one ML model each. In order to achieve this, the measurement samples collected during the measurement phase of the procedure can be used and a metric of distance between the different measurement samples may be defined. Note that a measurement sample is the vector of a measured beam signal strength measured and reported by one particular user terminal. The distance could be the number of different beam IDs with non-zero measurement value in the measurement vector. This means that the more the number of different beams is measured by two samples, the larger the distance between the two vectors and the more likely to separate them into different clusters. It is to be noted that there can be other algorithms than clustering methods used to create ML model sets.

As will be apparent from the above, embodiments of the systems and methods as described herein allow for significantly reducing the required channel quality measurements performed by the terminal. A near-optimal beam selection algorithm is presented that uses machine learning techniques to minimize as far as possible the number of channel quality measurements required to select the best beam for the user equipment.

It has been shown that embodiments of the systems and methods described herein may be applicable in practical systems, as shown for example in the results displayed in FIGS. 5 to 7 in which the systems and methods are implemented and evaluated in a real 5G radio testbed.

Embodiments of the systems and methods as described herein therefore enable achieving energy savings (by activating predicted beams only).

Embodiments of the systems and methods as described herein further provide for a fast prediction and execution while negligible computation overhead is put on the custom hardware of the radio unit and the cloud compute power is utilized as much as possible (which requires no extra hardware or compute on the 5G radio board).

Embodiments of the system as described herein fit well into distributed analytics architectures proposed in the art which may therefore be a candidate for being part of the 5G radio access network architecture.

No doubt many other effective alternatives will occur to the skilled person. It will be understood that the present disclosure is not limited to the described variants and encompasses modifications apparent to those skilled in the art and lying within the scope of the claims appended hereto.

The invention claimed is:

1. A system for antenna beam selection in a radio access network, the system comprising:
 a measurement module configured to obtain channel quality measurements of a plurality of beams usable to serve a user equipment in the radio access network;
 a training module coupled to the measurement module, wherein the training module is configured to generate a machine learning model based on the channel quality measurements; and
 a prediction module coupled to the training module, wherein the prediction module is configured to:
  receive the machine learning model from the training module, and
  select, based on the machine learning model, one of the plurality of beams used to serve the user equipment;
 wherein the prediction module is further configured to:
  continuously determine whether a new machine learning model is received from the training module, and
  when the channel quality measurements are obtained by the measurement module:
   send a request to the measurement module to provide, to the prediction module, channel quality of a subset of the plurality of beams,
  predict the selected beam based on the channel quality of the subset of the plurality of beams by feeding the channel quality measurements into the machine learning model, and
  output the selected beam to cause a baseband processing unit to switch its connection with the user equipment to the selected beam.

2. The system of claim 1, wherein the prediction module is further configured to perform the sending of the request to the measurement module to provide, to the prediction module, channel quality of the subset of the plurality of beams, the predicting of the selected beam based on the channel quality of the subset of the plurality of beams and the outputting of the selected beam to cause the baseband processing unit to switch its connection with the user equipment to the selected beam until a time period, starting from the new machine learning model being received by the prediction module, exceeds a predetermined threshold time period.

3. The system of claim 1, wherein the prediction module is further configured to:
 periodically determine accuracy of the machine learning model received from the training module, and
 if the accuracy is larger than a threshold accuracy, send a measurement inactivation command to the measurement module to inactivate channel quality measurements to be obtained for beams not comprised in the subset of the plurality of beams, and
 if the accuracy is smaller than the threshold accuracy, send an accuracy warning report to the training module to cause the training module to refine the machine learning model.

4. The system of claim 3, wherein the prediction module is further configured to perform the determination of accuracy of the machine learning model by:
 measuring the channel quality of each of the plurality of beams, and
 comparing the outcome of the measurement of the channel quality of each of the plurality of beams with the machine learning model received from the training module.

5. The system of claim 1, wherein the system is configured to select the subset from the plurality of beams such that the beams of the subset cover a substantially uniform area of the plurality of beams.

6. The system of claim 1, wherein, during a prediction phase, the prediction of the selected beam by the prediction module is based only on the channel quality of the subset of the plurality of beams.

7. The system of claim 6, wherein the measurement module is configured to obtain and provide to the training module, during a training phase, all channel quality measurements of the plurality of beams, and wherein the training module is configured to update the machine learning model based on all channel quality measurements of the plurality of beams received from the measurement module, and further wherein the system is configured to switch between the training phase and the prediction phase.

8. The system of claim 7, wherein the system is further configured to generate from a multiple switching between the training phase and the prediction phase a heuristic model usable to predict the beam with the highest channel quality among the plurality of beams.

9. A method for antenna beam selection in a radio access network, the method comprising:
 obtaining channel quality measurements of a plurality of beams useable to serve a user equipment in the radio access network;
 generating a machine learning model based on the channel quality measurements; and
 selecting, based on the machine learning model, one of the plurality of beams to serve the user equipment;
 wherein selecting one of the plurality of beams to serve the user equipment comprises predicting the selected beam based on a subset of the plurality of beams by feeding the channel quality measurements into the machine learning model, and outputting an indication of the selected beam, to cause a baseband processing unit of the radio access network to switch its connection with the user equipment to the selected beam.

10. The method of claim 9, further comprising periodically determining an accuracy of the machine learning model and, if the accuracy is below a threshold accuracy, initiating a refinement of the machine learning model, and, if the accuracy is above the threshold accuracy, inactivating channel quality measurements for beams not in the subset of the plurality of beams.

11. The method of claim 10, further comprising determining the accuracy of the machine learning model by:
 measuring the channel quality of each of the plurality of beams, and
 comparing the outcome of the measurement of the channel quality of each of the plurality of beams with the machine learning model.

12. The method of claim 9, further comprising selecting the subset of beams from the plurality of beams, such that the beams of the subset cover a substantially uniform area of the plurality of beams.

13. The method of claim 9, wherein, during a prediction phase, the prediction of the selected beam by the prediction module is based only on the channel quality of the subset of the plurality of beams.

14. A method of beam selection for a radio access network, the method comprising:
  collecting channel quality measurements for a plurality of beams that are usable by the radio access network for serving a User Equipment (UE), the plurality of beams including a subset of reference beams that are uniformly spaced within an overall coverage area corresponding to the plurality of beams;
  using the collected channel quality measurements to determine channel-quality relationships between beams in the subset and remaining beams in the plurality of beams;
  predicting channel qualities for the remaining beams in the plurality of beams, using updated channel quality measurements for the subset of reference beams and the determined channel-quality relationships; and
  select one of the beams in the plurality of beams, in dependence on the predicted channel qualities.

* * * * *